United States Patent
Zaderej et al.

(10) Patent No.: US 10,609,782 B2
(45) Date of Patent: Mar. 31, 2020

(54) FLEXIBLE LIGHT SOURCE

(71) Applicant: Molex, LLC, Lisle, IL (US)

(72) Inventors: Victor Zaderej, Wheaton, IL (US);
Christopher Blount, Naperville, IL (US); Megan E. Serwacki, Oswego, IL (US); Daniel B. McGowan, Glen Ellyn, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/120,722

(22) PCT Filed: Feb. 24, 2015

(86) PCT No.: PCT/US2015/017236
§ 371 (c)(1),
(2) Date: Aug. 22, 2016

(87) PCT Pub. No.: WO2015/127425
PCT Pub. Date: Aug. 27, 2015

(65) Prior Publication Data
US 2017/0064782 A1    Mar. 2, 2017

Related U.S. Application Data

(60) Provisional application No. 61/943,553, filed on Feb. 24, 2014.

(51) Int. Cl.
*H05B 37/02* (2006.01)
*H05B 33/08* (2020.01)
(Continued)

(52) U.S. Cl.
CPC ............ *H05B 33/089* (2013.01); *F21S 8/026* (2013.01); *F21V 3/00* (2013.01); *F21V 15/01* (2013.01);
(Continued)

(58) Field of Classification Search
CPC .......... F21V 29/503; F21V 3/00; F21V 23/02; F21V 23/06; H05B 33/0842; H05B 37/0272; H05B 33/089
(Continued)

(56) References Cited

U.S. PATENT DOCUMENTS

2006/0001384 A1   1/2006  Tain et al.
2006/0006821 A1   1/2006  Singer et al.
(Continued)

FOREIGN PATENT DOCUMENTS

WO    2015/127425 A1    8/2015

OTHER PUBLICATIONS

Extended European Search report received for European Patent Application No. 15752592.4, dated Jul. 11, 2017, 12 pages.
(Continued)

*Primary Examiner* — Dedei K Hammond
*Assistant Examiner* — Amy X Yang
(74) *Attorney, Agent, or Firm* — Molex, LLC

(57) ABSTRACT

A light emitting diode (LED) fixture is provided. The fixture includes a housing that supports an LED array. A power supply can be coupled to the housing via a connector. A controller with a constant current driver can be configured to actuate the LED array. In an embodiment the controller can be configured to control operation of the LED array based on a sensed signal.

8 Claims, 11 Drawing Sheets

(51) Int. Cl.
*F21S 8/02* (2006.01)
*F21V 3/00* (2015.01)
*F21V 15/01* (2006.01)
*F21V 23/00* (2015.01)
*F21V 23/06* (2006.01)
*F21V 29/503* (2015.01)
*F21Y 105/10* (2016.01)
*F21Y 115/10* (2016.01)

(52) U.S. Cl.
CPC .......... *F21V 23/002* (2013.01); *F21V 23/003* (2013.01); *F21V 23/06* (2013.01); *H05B 33/0803* (2013.01); *H05B 33/0842* (2013.01); *H05B 37/0218* (2013.01); *H05B 37/0227* (2013.01); *H05B 37/0272* (2013.01); *F21V 29/503* (2015.01); *F21Y 2105/10* (2016.08); *F21Y 2115/10* (2016.08); *Y02B 20/46* (2013.01)

(58) Field of Classification Search
USPC ............. 315/291, 296, 158, 307, 309, 185 R
See application file for complete search history.

(56) References Cited

U.S. PATENT DOCUMENTS

| | | | |
|---|---|---|---|
| 2006/0009061 A1* | 1/2006 | Machado | H01R 13/514 439/215 |
| 2007/0273307 A1 | 11/2007 | Westrick et al. | |
| 2009/0034228 A1 | 2/2009 | Tsai et al. | |
| 2010/0315012 A1* | 12/2010 | Kim | F21K 9/00 315/185 R |
| 2011/0151626 A1 | 6/2011 | Lin et al. | |
| 2012/0007505 A1* | 1/2012 | Hayashi | F21S 48/1109 315/77 |
| 2012/0074852 A1* | 3/2012 | Delnoij | H05B 37/0218 315/158 |
| 2012/0119661 A1* | 5/2012 | Muller | F21K 9/00 315/158 |
| 2013/0082612 A1 | 4/2013 | Kim et al. | |

OTHER PUBLICATIONS

Notice of Allowance received for Taiwan Patent application No. 104105816, dated Aug. 22, 2017, 2 pages of official copy only.
Office Action received for Taiwan Patent application No. 104105816, dated Dec. 14, 2016, 5 pages of official copy only.
Office Action received for Chinese Patent application No. 201580020482.X, dated Jul. 3, 2017, 7 pages of official copy including search report.
International Search report and written opinion received for PCT Patent Application No. PCT/US2015/017236, dated Apr. 30, 2015, 9 pages.
International Preliminary report on Patentability and written opinion received for PCT Patent Application No. PCT/US2015/017236, dated Sep. 9, 2016, 8 pages.

* cited by examiner

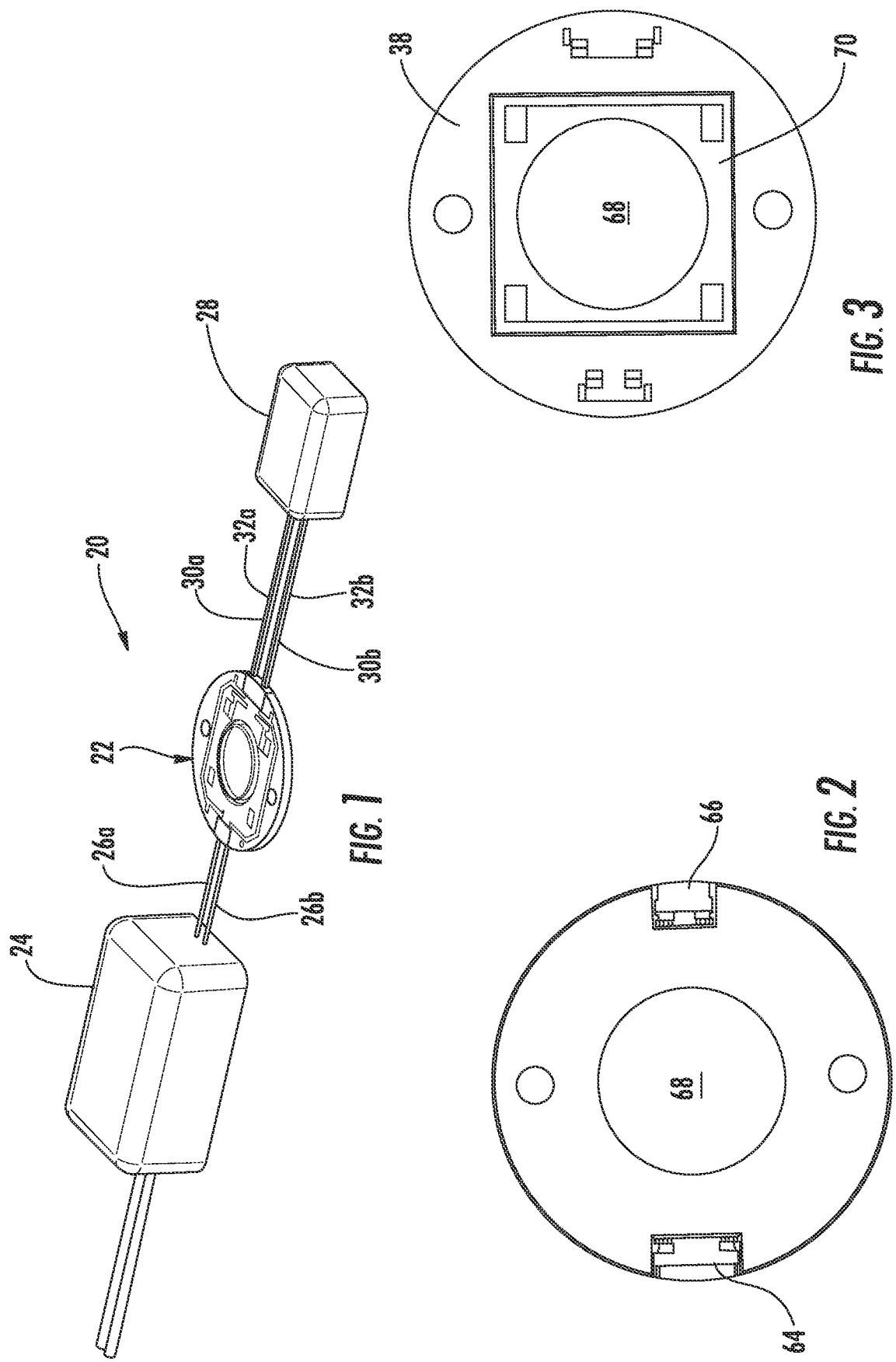

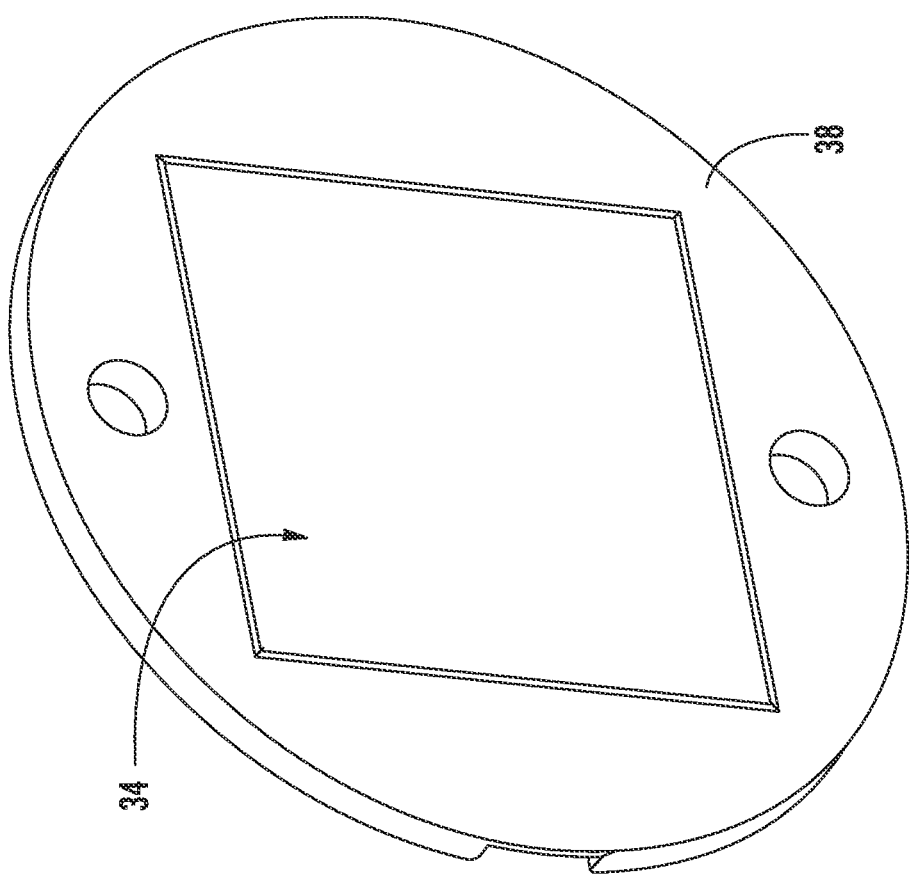

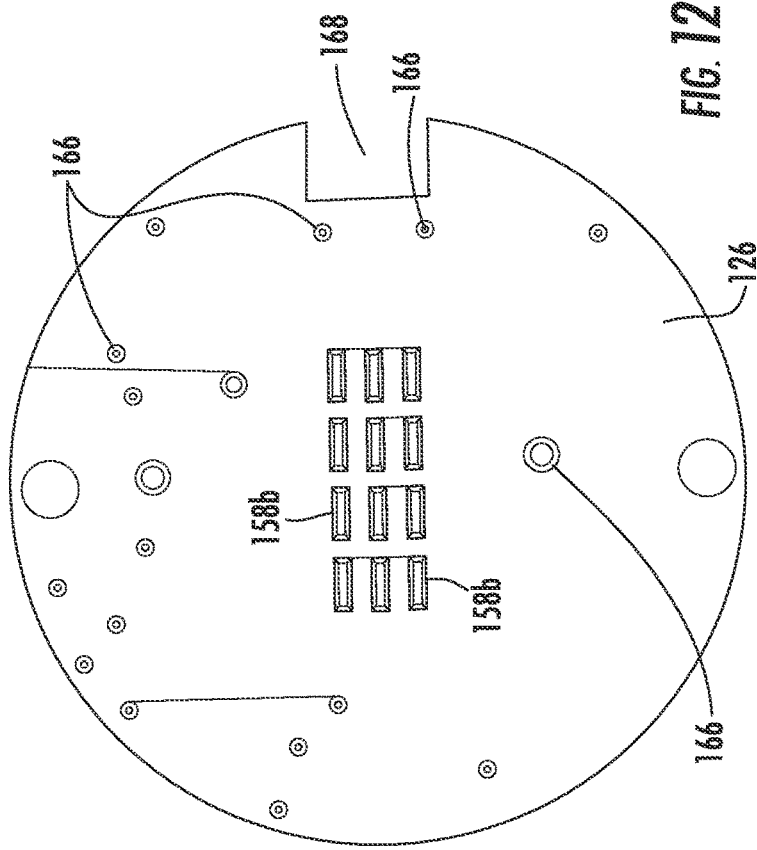
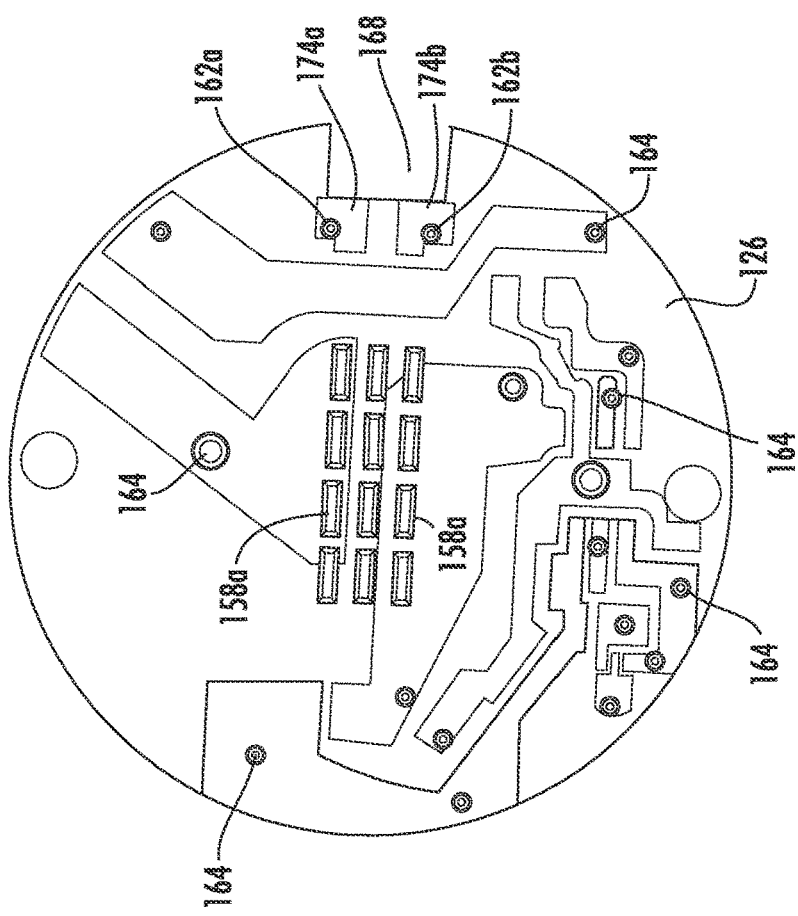

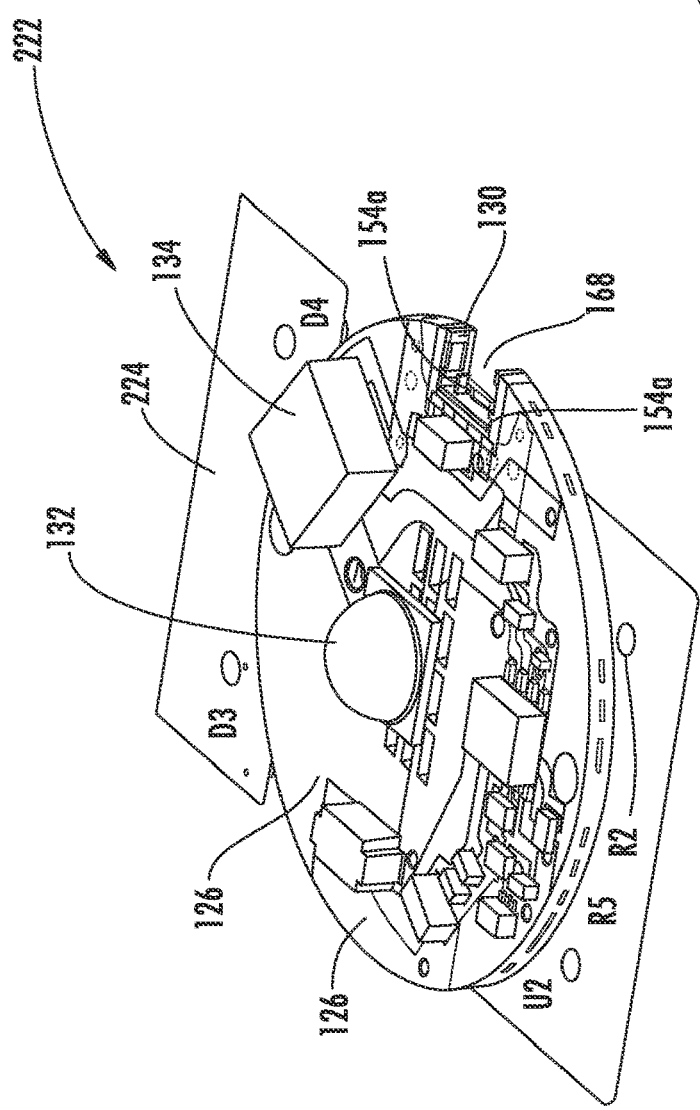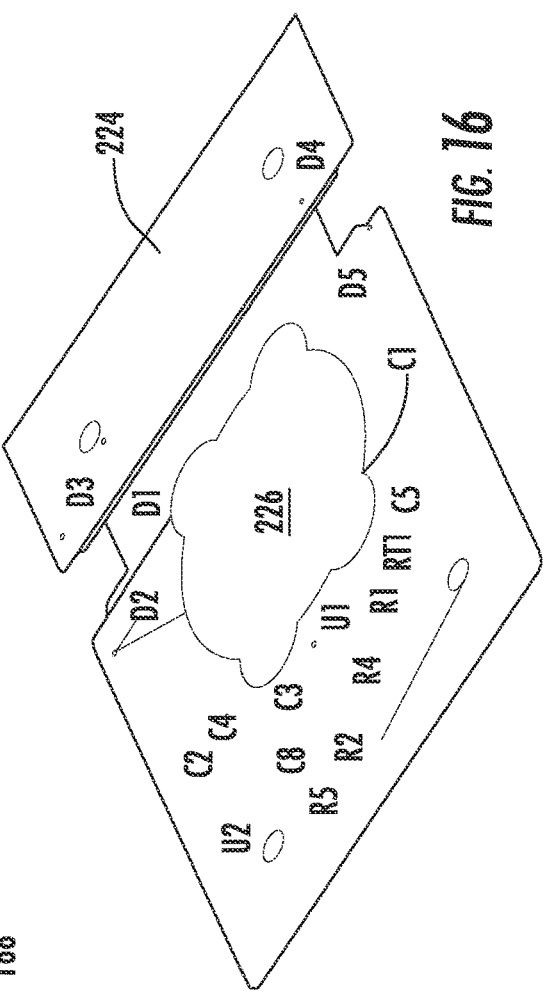

FLEXIBLE LIGHT SOURCE

RELATED APPLICATIONS

This application claims priority to U.S. Provisional Application No. 61/943,553, filed Feb. 24, 2014.

TECHNICAL FIELD

This disclosure relates to field of illumination, more specifically to the field of illumination with the use of a light fixture that can include a light emitting diode (LED).

DESCRIPTION OF RELATED ART

Light emitting diode (LED) based fixtures are known. One common design is to include a fixture with an integrated LED array and other circuitry required to actuate the LED array. This can allow for an efficient design but tends to be problematic in the event that a component fails as one must replace the entire fixture.

Another method of managing this is to have a power supply and controller supported by the fixture (typically on the back side of the fixture) and to just use a simple holder to support an LED array in position. This is preferable to the first design as it is modular and allows for the replacement of components if they fail. However, replacement is still costly as it generally will require the use of an electrician to manage the connection of a new power supply and/or controller. Another issue with such a design is that it requires a particular design of the LED array to function. If the LED array is changed (due, for example, to improvements in efficiency) it becomes problematic to adjust the controller. Thus certain individuals would appreciate further improvements to an LED fixture.

SUMMARY

A light emitting diode (LED) fixture is provided that includes a housing that supports an LED array on a substrate. The substrate includes an anode and a cathode. The housing includes a first and second recess. A first pair of terminals extends from the first recess to the second recess. A second pair of terminals extend from the second recess to the anode and cathode. A dongle is connected to the second recess with a first connector. The dongle is configured to receive power from the first terminals and selectively apply power to the second pair of terminals so as to actuate the LED array. In an embodiment the dongle can include a constant current driver, a sensor, a wireless receiver and other desired components. The dongle can also be configured to control the LED array based on a sensed temperature of the LED array.

BRIEF DESCRIPTION OF THE DRAWINGS

The present invention is illustrated by way of example and not limited in the accompanying figures in which like reference numerals indicate similar elements and in which:

FIG. 1 is a perspective view of an embodiment of a light emitting diode (LED) fixture.

FIG. 2 is a plane view of a housing suitable for use the LED fixture depicted in FIG. 1.

FIG. 3 is a bottom view of the embodiment depicted in FIG. 2.

FIG. 4A is another perspective view of the embodiment depicted in FIG. 4.

FIG. 11 is a plan view of an embodiment of a housing suitable for use in an LED fixture.

FIG. 12 is a bottom view of the embodiment depicted in FIG. 11.

FIG. 13 is another perspective view of the embodiment depicted in FIG. 7.

FIG. 15 is a simplified perspective view of the embodiment depicted in FIG. 14.

FIG. 16 is a perspective view of a flex circuit suitable for use in the embodiment depicted in FIG. 14.

DETAILED DESCRIPTION

Figure 4:
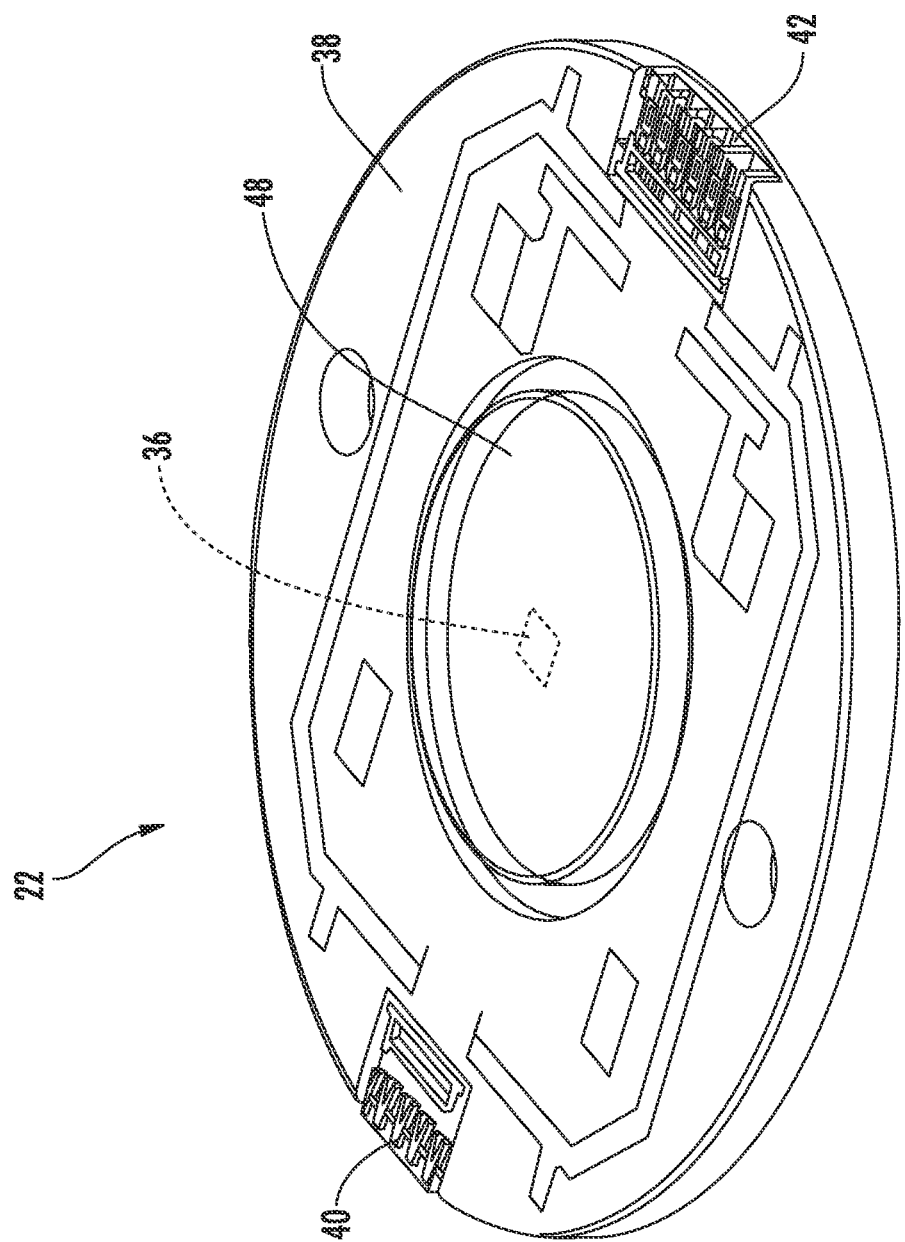
FIG. 4 is a perspective view of an embodiment of a housing.
Figure 5:
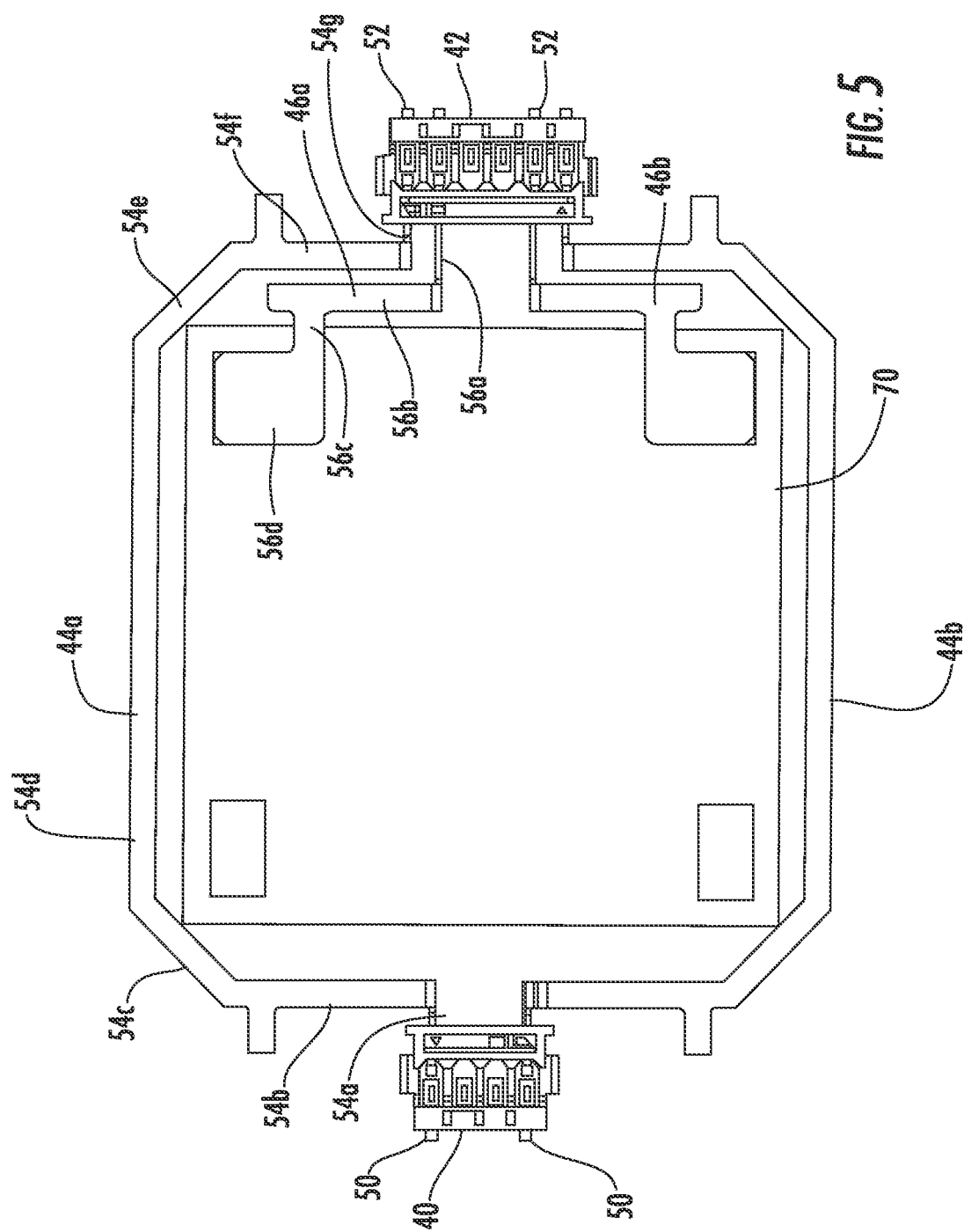
FIG. 5 is a plane view of an embodiment of terminals that can be supported by the housing depicted in FIG. 4.
Figure 6:
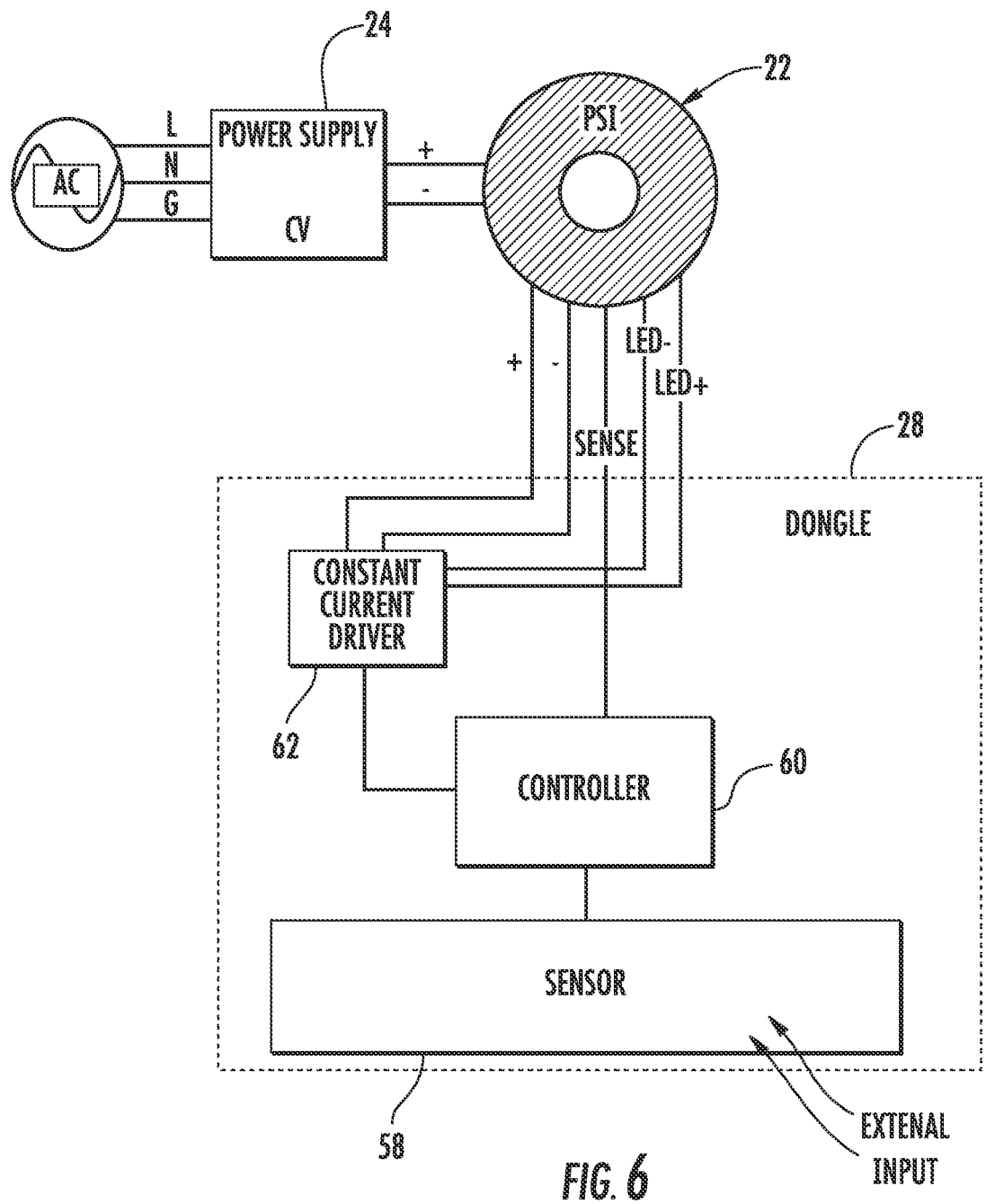
FIG. 6 is a schematic representation of an embodiment of an LED fixture.
Figure 7:
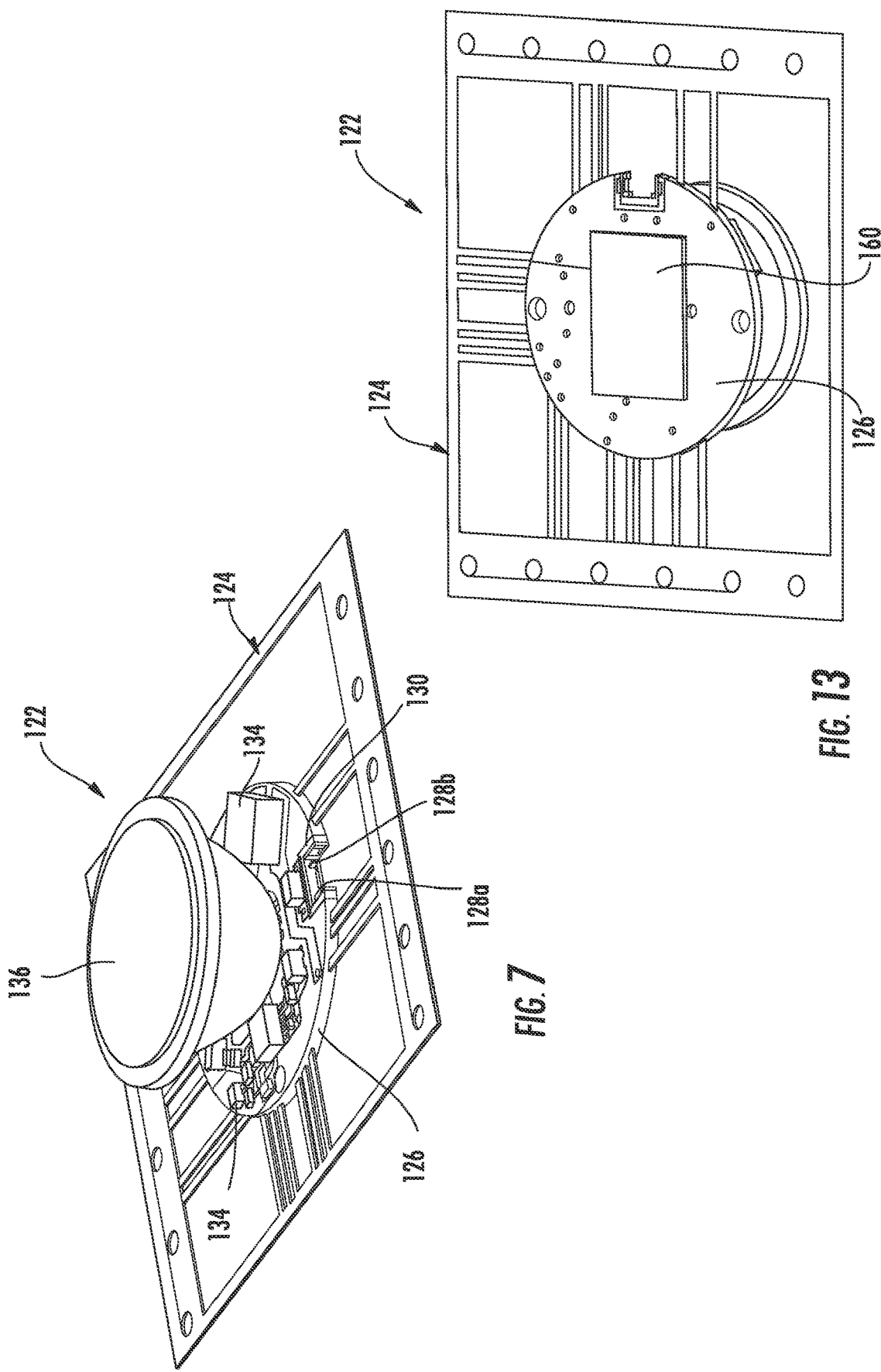
FIG. 7 is a perspective view of another embodiment of a portion of an LED fixture.
Figure 8:
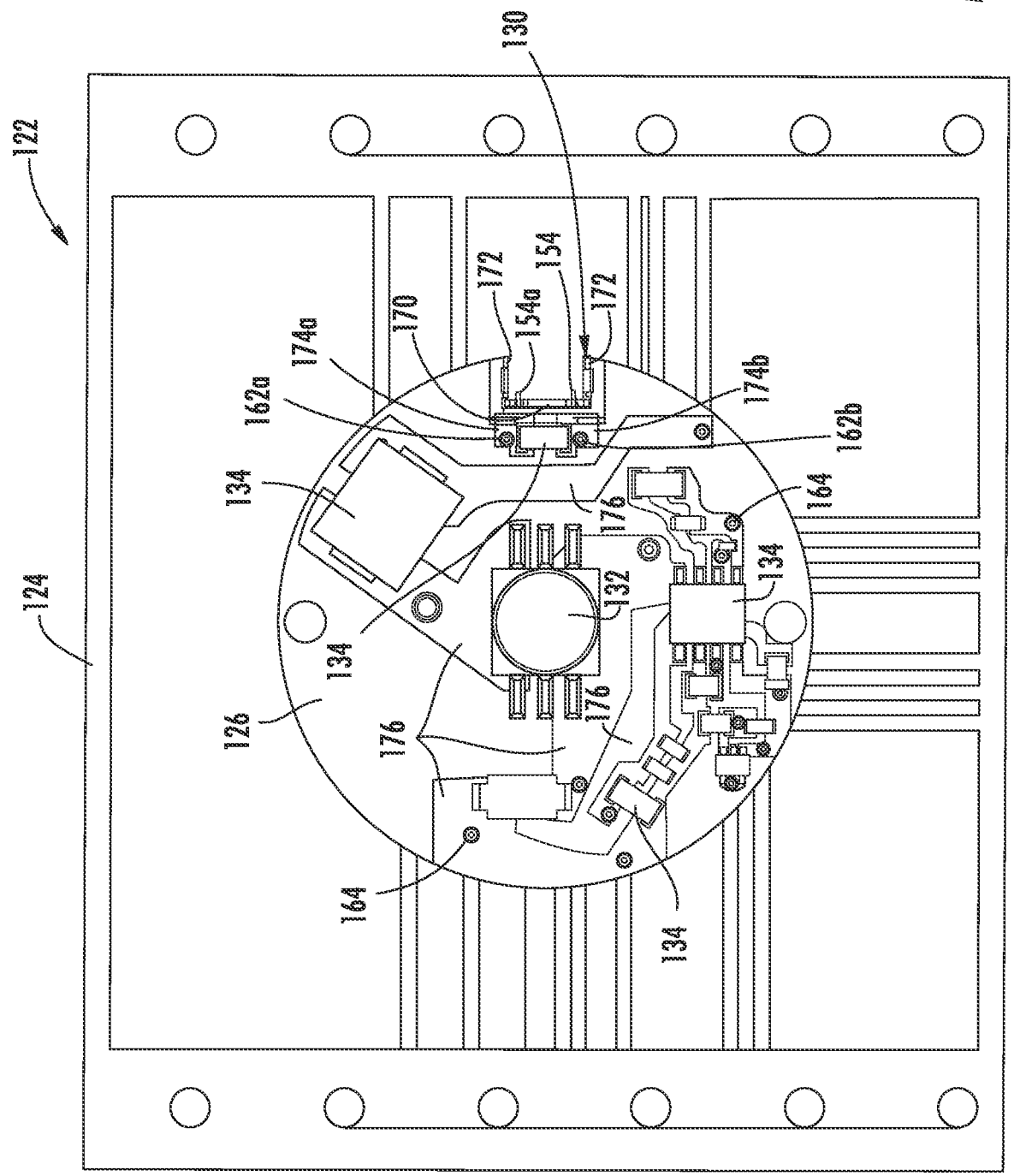
FIG. 8 is a top simplified view of the embodiment depicted in FIG. 7.
Figure 9:
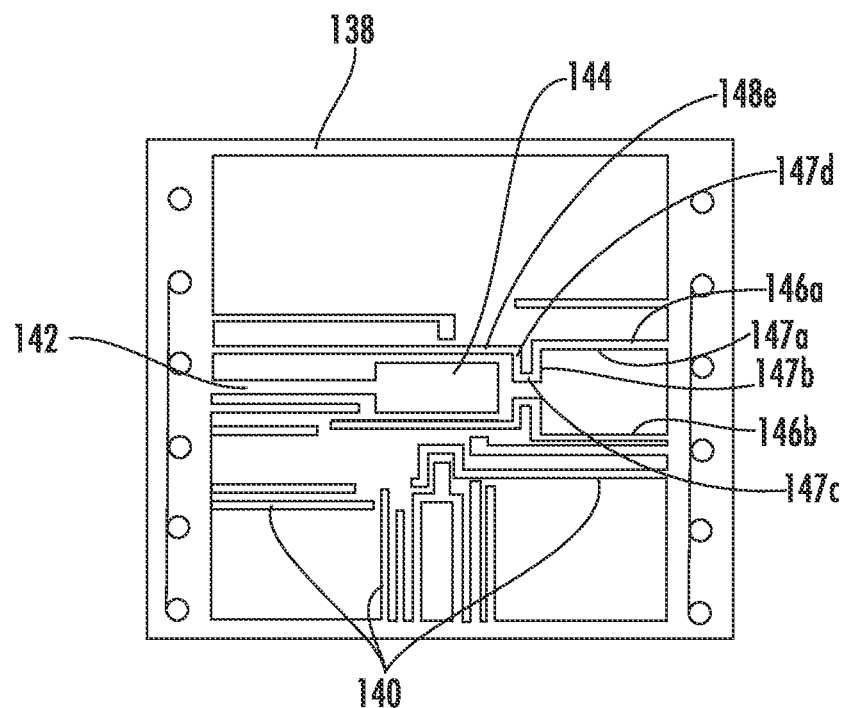
FIG. 9 is a top view of terminals supported by a carrier.
Figure 10:
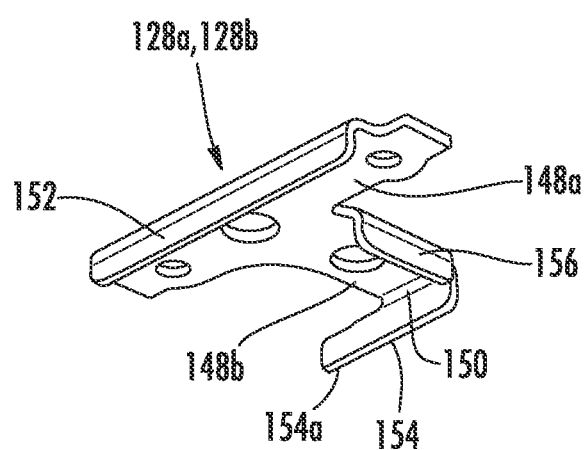
FIG. 10 is a perspective view of a terminal suitable for use in a housing.

The detailed description that follows describes exemplary embodiments and is not intended to be limited to the expressly disclosed combination(s) as a person of skill in the art would understand that the depicted features can be used in a variety of combinations. Therefore, unless otherwise noted, features disclosed herein may be combined together to form additional combinations that were not otherwise shown for purposes of brevity.

FIGS. 1-6 show a solid state lighting (SSL) fixture 20 which includes a light assembly 22, a power supply 24 connected by wires 26a, 26b to the light assembly 22, and a dongle 28 connected by wires 30a, 30b to the power supply 24 and by wires 32a, 32b to the light assembly 22. The SSL fixture 20 is mounted on a surface, such as a ceiling. The power supply 24 is mounted behind the surface, the light assembly 22 is mounted on the surface and may be mounted to be flush with the surface, and the dongle 28 is in front of the surface and may be positioned in front of the light assembly 22. Because the power supply 24 can only be made so small, it is not aesthetically pleasing to have the power source 24 exposed to view. In the depicted embodiment the power source 24 remains hidden, but is able to power the light assembly 22 and the dongle 28. The dongle 28 can be very small and does not detract from the aesthetics of the SSL fixture 20 and thus can be visible in certain applications (but in other applications could also be hidden).

The light assembly 22 includes a substrate 34 on which a light emitting diode (LED) or an array of LEDs 36 and its associated electrical components are mounted. The substrate can include a conductive material with an insulative coating on which the array of LEDs 36 is mounted. The substrate 34 is mounted in a housing 38 that is formed of an insulative material. A first connector 40 is mounted on the housing 38 and is connected to the wires 26a, 26b. A second connector 42 is mounted on the housing 38 and is connected to the wires 30a, 30b, 32a, 32b. A first pair of terminals 44a, 44b are connected between the first connector 40 and the second connector 42. A second pair of terminals 46a, 46b are connected between the second connector 42 and an anode and a cathode formed on the substrate 34. The LED(s) 36 is mounted on the substrate 34 and is covered by a lens 48.

As shown, the first connector 40 is positioned proximate to a first end of the substrate 34 and the second connector 42 is positioned proximate to a second, opposite end of the substrate 34. The connectors 40, 42 are formed in known manner and include a passageways therethrough in which conductive mating terminals 50, 52 are mounted and connect to the respective wires 26a, 26b, 30a, 30b, 32a, 32b and terminals 44a, 44b, 46a, 46b in a known manner.

As shown, each first terminal 44a, 44b does not directly contact the substrate 34. While this can take many forms, as shown, each first terminal 44a, 44b generally extends around the periphery of the substrate 34 and includes a first portion 54a which extends from the mating terminal 50 in the first connector 40, a second portion 54b which is perpendicular to the first portion 54a, a third portion 54c which angles relative to the second portion 54b, a fourth portion 54d which angles relative to the third portion 54c and is perpendicular to the second portion 54b, a fifth portion 54e which angles relative to the fourth portion 54d, a sixth portion 54f which angles relative to the fifth portion 54e and is perpendicular to the fourth portion 54d and is parallel to the second portion 54b, and a seventh portion 54g which is perpendicular to the sixth portion 54f and parallel to the first portion 54a. The seventh portion 54g extends from the mating terminal 52 in the second connector 42. The ends of the first terminals 44a, 44b are soldered to the mating terminals 50, 52.

Each second terminal 46a, 46b extends between the respective mating terminals 52 in the second connector 42 and the anode or cathode on the substrate 34. As shown, each second terminal 46a, 46b includes a first portion 56a which extends from the respective mating terminal 52 in the second connector 42, a second portion 56b which is perpendicular to the first portion 56a, a third portion 56c which is perpendicular to the second portion 56b and parallel to the first portion 56a, and a fourth portion 56d extending from the third portion 56c and is formed as an enlarged pad which overlays the anode or the cathode on the substrate 34. The ends of the second terminals 46a, 46b are soldered to the mating terminals 52 and to the anode/cathode on the substrate 34.

Vias (not shown) can be provided through the substrate 34 underneath or proximate to the mounting position of the LED(s) 36 and a thermal pad or heat sink (not shown) can be provided on the opposite side of the substrate 34 underneath the vias to control the heat dissipation from the LED(s) 36 in a known manner.

As a result of this structure, power is delivered to the LED(s) 36 by current flowing from the power source 24, via wire 26a, through the mating terminal 50 in the first connector 40, through first terminal 44a, through mating terminal 52 in the second connector 42, via wire 30a, to the dongle 28, back via wire 32a and its mating terminal 52 in the second connector 42, through second terminal 46a and to the LED(s) 36. This powers both the dongle 28 and the LED(s) 36. The current flows out through cathode, through second terminal 46b, through mating terminal 52 in the second connector 42, via wire 32b, through dongle 28, via wire 30b, through first terminal 44b, through mating terminal 50 in the first connector 40, via wire 26b, and back to the power supply 24.

The dongle 28 is in front of the light assembly 22 and is used in the control of the light assembly 22. The dongle 28 can be configured to provide an open loop or a closed loop control system. The dongle 28 houses a sensor(s) 58 which can receive information from the light assembly 22 or from external sources, a controller 60 connected to the sensor(s) 58 and connected to the light assembly 22 via a mating terminal 52 in an unused passageway through the second connector 42, and a constant current driver 62 connected to the light assembly 22 via second connector 42. The dongle 28 can be used to provide control features such as wireless control, day light sensing, motion control, occupancy and the like. The sensors provide feedback to the light assembly 22 and to the power supply 24 and are used to optimize the operation of the SSL fixture 20.

The housing 38 has a first recess 64 into which the first connector 40 is mounted, and a second recess 66 in an opposed position into which the second connector 42 is mounted. An opening 68, shown as circular in the drawings, is provided through the center of the housing 38. A recess 70, shown as square in the drawings, is formed on a back side of the housing 38 and surrounds the opening 68. The substrate 34 mounts in the recess 70 such that the LED(s) 36 aligns with the opening 68. The lens 48 seats over the opening 68 and the LED(s) 36. The terminals 44a, 44b, 46a, 46b are preferably embedded into the housing 38.

The SSL fixture 20 can provide the following LED protection: overcurrent protection (with an inline fuse); resettable, non-resettable, or thermal overvoltage protection (with a metal-oxide varistor (MOV), TVS diode, or Zener diode); LED failure protection with a shunt or bypass (for series connection); ESD Protection (for isolation, filtering, or suppression); and UV Protection (with layers, coatings, or films). Thus the SSL fixture 20 can provide the following enhancements: current control, thermal control, interconnections and allows for series and parallel configurations. Consequentially, multiple light assemblies 22 can be assembled together in series or in parallel using wires and connectors to connect to terminals on respective light assemblies 22 together.

FIGS. 7-13 show a second embodiment of a SSL fixture which includes a light assembly 122 which is connected to a power supply and may be connected to a dongle as shown in the first embodiment but that can include additional circuitry and/or sensors and can have a built in constant current driver and even a controller and thus may also omit the dongle. The light assembly 122 is mounted on a surface, such as a ceiling. The power supply is mounted behind the surface, the light assembly 122 is mounted on the surface and may be mounted to be flush with the surface, and the dongle, if provided, is in front of the surface and may be positioned in front of the light assembly 122. As can be appreciated, the depicted embodiment thus allows for a fixture in which more components are included directly on the housing.

The light assembly 122 includes a metal carrier 124 upon which a housing 126 is mounted (typically in an insert-molding process), and upon which a pair of power terminals 128a, 128b are mounted. A connector 130 is mounted on the housing 126 and houses the power terminals 128a, 128b. A light emitting diode (LED) or an array of LEDs 132 and its associated electrical components 134 are mounted on the housing 126. The LED(s) 132 are covered by a lens 136 mounted on the housing 126.

The carrier 124 is conductive and may be funned by stamping the carrier 124 into the desired shape. In its initial form, the carrier 124 has outer frame 138 which includes an outer periphery, shown as four sides in the drawings, and a plurality of separate fingers 140 extending inwardly from the periphery of the frame 138. A central finger 142 extending from the periphery includes an enlarged head 144 at its end which is positioned in the center of the frame 138. The free ends of the fingers 140 do not contact each other. A first power terminal mating finger 146a extends from one side of the frame 138 to the other side of the frame 138. A second power terminal mating finger 146b extends from the same side of the frame 138 at a position spaced from the first power terminal mating finger 146a. Each power terminal mating finger 146a, 146b includes a first portion 147a extending from the periphery of the frame 138, a second portion 147b extending from the first portion 147a and which is perpendicular to the first portion 147a, a third portion 147c extending from the second portion 147c and which is perpendicular to the second portion 147b, a fourth portion 147c extending from the third portion 147c and which is perpendicular to the third portion 147c, and a fifth portion extending from the fourth portion 147c and which is perpendicular to the fourth portion 147d. The first, third and fifth portions 147a, 147c, 147e are parallel to each other. It should be noted that a wide variety of configurations are possible and the depicted configuration is merely representative of one configuration.

The power terminals 128a, 128b are conductive and may be formed by stamping and bending the power terminals 128a, 128b into the desired shape. Each power terminal 128a, 128b includes a generally T-shaped body having a first leg 148a having a first end and a second end, which has a second leg 148b extending from the second end at a middle thereof. The second leg 148b has opposite sides and a free end 150. The first leg 148a has a flange 152 extending downwardly from the first end. The second leg 148b has a flange 154 extending downwardly from its end 150, and the flange 154 is parallel to the flange 152. The flange 154 has an extending terminal portion 154a which extends outwardly from the leg 148b. The second leg 148b further has a flange 156 extending from one side thereof which is perpendicular to the flange 154. The power terminals 128a, 128b are connected to the frame 138 by the flange 154 mating with the second portion 147b of the power terminal mating fingers 146a, 146b. The other flanges 152, 156 can also be connected to the power terminal mating fingers 146a, 146b.

The housing 126 can be formed from Laser Direct Structuring (LDS) material, the process of LDS being known in the art. The housing 126 has a plurality of openings 158a formed in the top surface thereof and a plurality of openings 158b formed in the bottom surface thereof as described herein. The respective openings 158a, 158b align with each other to form vias. The vias provide for heat transfer from the LED(s) 132 mounted on the housing 126 to the environment. A thermal pad or heat sink 160 is provided on the opposite side of the housing 126 underneath the vias to control the heat dissipation from the LED(s) 136 in a known manner. The housing 126 further includes a plurality of openings 162a, 162b, 164 formed in the top surface thereof, and may include openings 166 in the bottom surface of the housing 126 which align with some of the openings 162a, 162b, 164. A recess 168 is formed in the periphery of the housing 126 for housing the connector 130.

The connector 130 is generally U-shaped and has a base wall 170 and two depending walls 172 extending from the base wall 170. The connector 130 conforms to the shape of the recess 168 in the housing 126. The extending terminal portions 154a of the power terminals 128a, 128b extend through the base wall 170 of the connector 130. The connector 130 has features known in the art for mating with an associated connector (not shown).

To form the light assembly 122, the power terminals 128a, 128b are attached to the carrier 124 by suitable means, such as soldering. The housing 126 is then molded over the carrier 124 and the power terminals 128a, 128b such that the carrier 124 and the power terminals 128a, 128b are embedded within the housing 126. The extending terminal portions 154a of the power terminals 128a, 128b are exposed in the recess 168.

A laser is applied to the housing 126 to create the desired pattern(s) of traces 174a, 174b, 176 on the housing 126, and to form the vias formed by openings 158a, 158b and the openings 162a, 162b, 164, 166. Openings 162a, 162b are within traces 174a, 174b and align with the second leg 148b of the power terminals 128a, 128b. The remaining openings 164 are within at least one of the other traces 176 and each aligns with a finger 140 (and more than one opening can be aligned with the same finger). The vias formed by openings 158a, 158b align with the enlarged head 144. As a result, the carrier 124 is exposed on its top surface and its bottom surface by the openings 162a, 162b, 164 and the vias formed by openings 158a, 158b. The laser activates the LDS material of the housing 126. This forms a subassembly.

The activated materials can next be electroless plated so that the traces are electrically connected to the carrier. Next, a current can be applied to the carrier 124. The subassembly is run through a metal bath to plate to electroplate the subassembly. Since the LDS material of the housing 126 has been activated and plated, any surface of the housing 126 that has the traces 174a, 174b, 176, vias formed by openings 158a, 158b or openings 162a, 162b, 164, 166 will be plated. After the electroplating, the plated traces 174a, 174b, 176, vias formed by openings 158a, 158b and openings 162a, 162b, 164, 166 are in electrical communication with the carrier 124 via the plating provided by the electroplating.

The thermal pad or heat sink 160 is attached to the underside of the housing 126 and aligns with the vias formed by openings 158a, 158b, and the LED(s) 132 and the electrical components 134 are attached to the top surface of the housing 126 between the appropriate traces 174a, 174b, 176 to electrically connect the traces 174a, 174b, 176 and to form an assembly. The assembly is run through reflow to complete the attachment of the LED(s) 132 and the electrical components 134 to the housing 126.

The connector 130 is attached to the housing 126 such that the extending terminal portions 154a of the power terminals 128a, 128b extend therethrough. In use, the connector 130 is attached to another connector (not shown) to provide power to the assembly.

The portions of the carrier 124 which are external to the periphery of the housing 126 are cut by suitable means to separate the fingers 140, 146a, 146b from each other.

As a result of this structure, power is delivered to the LED(s) 36 by current flowing from the power source, through extending terminal portion 154a and then through power terminal 128a, through opening 162a to trace 174a to power the electrical component 134 thereon. The current also runs along finger 146a, through the other opening 164 on that finger 146a and is distributed to traces 176 and the electrical components 134 mounted on the substrate. Current flows back through the carrier 124, through trace 174b and opening 162b to the extending terminal portion 154a of power terminal 128b. While a specific trace pattern with its associated electrical components is shown in the drawings, it is to be understood that this is representative one of type of trace pattern and associated electrical components, and the invention is not limited to this specific pattern.

Figure 14:
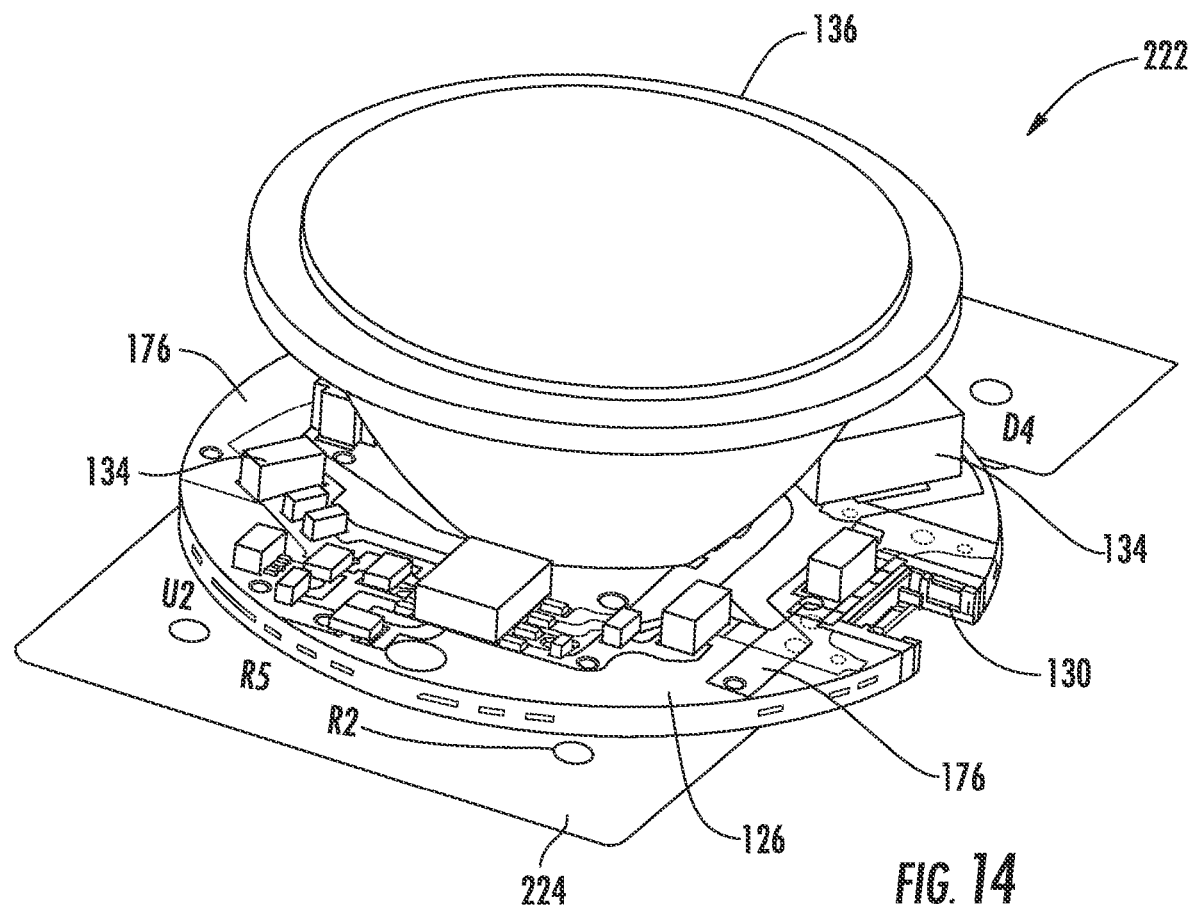
FIG. 14 is a perspective view of another embodiment of a portion of a fixture that includes a flex circuit.

FIGS. 14-16 show a third embodiment of a light assembly 222 which is connected to a power supply and may be connected to a dongle as shown in the first embodiment. The light assembly 222 is mounted on a surface, such as a ceiling. The power supply is mounted behind the surface, the light assembly 222 is mounted on the surface and may be mounted to be flush with the surface, and the dongle, if provided, is in front of the surface and may be positioned in front of the light assembly 222.

The third embodiment of the light assembly 222 is identical to the light assembly 122 of the second embodiment, except that instead of the metal carrier 124, a flexible circuit 224 is provided. As is known in the art, the flexible circuit 224 is formed from a thin polymer film having a conductive pattern applied thereto. The conductive pattern can be the same as that formed by the fingers 140, 146a, 146b of the carrier 124, except that the flexible circuit 224 has a central opening 226 formed therethrough instead of the enlarged head 144.

To form the light assembly 222 of the third embodiment, the power terminals 128a, 128b are attached to the flexible circuit 224 by attaching the flange 154 on each power terminal 128a, 128b to the conductive pattern on the flexible circuit 224 by suitable means, such as soldering. The housing 126 is then molded over the flexible circuit 224 and the power terminals 128a, 128b such that the flexible circuit 224 and the power terminals 128a, 128b are embedded within the housing 126. The recess 168 is formed in the housing 126 and the extending terminal portions 154a of the power terminal 128a, 128b are exposed in this recess 168.

Like that of the second embodiment, a laser is applied to the housing 126 to create the desired pattern(s) of traces 174a, 174b, 176 on the housing 126, and to form the vias formed by openings 158a, 158b and the openings 162a, 162b, 164, 166. Openings 162a, 162b are within traces 174a, 174b and align with the second leg 148b of the power terminals 128a, 128b. The remaining openings 164 are within at least one of the other traces 176 and each aligns with a fingers formed by conductive pattern on the flexible circuit 224 (and more than one opening can be aligned with the same finger). The vias formed by openings 158a, 158b align with the central opening 226. As a result, the flexible circuit 224 is exposed on its top surface and its bottom surface by the openings 162a, 162b, 164 and the vias formed by openings 158a, 158b. The laser activates the LDS material of the housing 126. This forms a subassembly.

The subassembly is run through a metal bath to plate to plate the subassembly. Since the LDS material of the housing 126 has been activated, any surface of the housing 126 that has the traces 174a, 174b, 176, vias formed by openings 158a, 158b or openings 162a, 162b, 164, 166 will be plated electrolessly. Next, a current is applied to the flexible circuit 224 and thus to the traces formed on the activated LDS material of the housing 126. The electroplating provides a thicker plating and increases the current carrying capabilities faster than electroless plating can and thus is preferable. After the electroplating, the plated traces 174a, 174b, 176, vias formed by openings 158a, 158b and openings 162a, 162b, 164, 166 are in electrical communication with the flexible circuit 224.

The thermal pad or heat sink 160 is attached to the underside of the housing 126 and aligns with the vias formed by openings 158a, 158b, and the LED(s) 132 and the electrical components 134 are attached to the top surface of the housing 126 between the appropriate traces 174a, 174b, 176 to electrically connect the traces 174a, 174b, 176 and to form an assembly. The assembly is run through reflow to complete the attachment of the LED(s) 132 and the electrical components 134 to the housing 126.

The connector 130 is attached to the housing 126 such that the extending terminal portions 154a of the power terminals 128a, 128b extend therethrough. In use, the connector 130 is attached to another connector (not shown) to provide power to the assembly. The portions of the flexible circuit 224 which are external to the periphery of the housing 126 are cut by suitable means.

Current flows through the light assembly 222 of this third embodiment in the same manner as that described for the second embodiment of the light assembly 122.

It should be noted that the plating providing on the housing 126 can also be applied in other methods than just LDS. For example, a conductive ink could be applied to the housing using an ink jet type of process. Naturally, combinations of plating and coating can also be used. Thus any other method of applying a trace in an additive manner would also be suitable and this feature is not intended to be limiting unless otherwise noted.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. A light emitting diode (LED) fixture, comprising:
a housing having a first recess and a second recess;
a substrate supported by the housing, the substrate supporting an array of LEDs and including an anode and a cathode;
a first pair of terminals extending from the first recess to the second recess, the first pair of terminals having contacts in the first recess and the second recess, the first pair of terminals configured to convey power from the contacts in the first recess to the contacts in the second recess but not to the anode and cathode;
a second pair of terminals extending from the second recess, one of the second pair of terminals extending to the anode and the other of the second pair of terminals extending to the cathode, wherein the first and second pair of terminals have contacts in the second recess that together form a plurality of second recess contacts, the plurality of second recess contacts comprising a first portion of contacts and a second portion of contacts;
a dongle with a first connector, the first connector configured to mate with the plurality of second recess contacts, the dongle configured to receive power via the first connector and the first portion of contacts, the dongle including a controller configured to selectively provide power to the anode and cathode via the first connector and the second portion of contacts and the second pair of terminals.

2. The LED fixture of claim 1, wherein the dongle includes a sensor and the controller is configured to modify provision of power based on input from the sensor.

3. The LED fixture of claim 2, wherein the sensor is a wireless antenna.

4. The LED fixture of claim 2, further comprising a power supply with a second connector, wherein each terminal of the first pair of terminals in the first recess includes a first recess contact and the second connector is electrically connected to the first recess contacts of the first pair of terminals.

5. The LED fixture of claim 4, wherein the dongle includes a constant current driver.

6. A light emitting diode (LED) fixture, comprising:
a housing having a first recess and a second recess;
a substrate supported by the housing, the substrate supporting an array of LEDs, a constant current driver and including an anode and a cathode;
a first pair of terminals extending from the first recess to the second recess, the first pair of terminals having contacts in the first recess and the second recess, the first pair of terminals configured to convey power from the contacts in the first recess to the contacts in the second recess but not to the anode and cathode;
a second pair of terminals extending from the second recess, one of the second pair of terminals extending to the anode and the other of the second pair of terminals extending to the cathode, wherein the first and second pair of terminals have contacts in the second recess;
a dongle with a first connector, the first connector configured to mate with contacts in the second recess from both the first and second pair of terminals, the dongle configured to receive power via the first connector and a portion of the contacts in the second recess, the dongle including a sensor configured to provide a signal that is used to control the constant current driver, and the dongle configured to provide power to the anode and cathode via the first connector and the second pair of terminals.

7. The LED fixture of claim 6, wherein the substrate supports a controller.

8. The LED fixture of claim 6, wherein the dongle includes a controller.

* * * * *